United States Patent [19]
Mann

[11] 3,949,917
[45] Apr. 13, 1976

[54] AUTOMOBILE NOTE PAD ASSEMBLY

[76] Inventor: John R. Mann, 19764 Corbin Drive, Chatsworth, Calif. 91311

[22] Filed: Oct. 11, 1974

[21] Appl. No.: 514,006

[52] U.S. Cl................. 224/29 D; 248/447; 281/15 B
[51] Int. Cl.²........................................... B42D 1/00
[58] Field of Search........ 281/15 R, 15 A, 15 B, 16, 281/17, 19 R; 224/29 D; 248/447

[56] References Cited
UNITED STATES PATENTS

| 305,755 | 9/1884 | McDonald | 281/16 |
|---|---|---|---|
| 1,508,823 | 9/1924 | Schade | 281/15 R |
| 1,656,217 | 1/1928 | Miller et al. | 281/17 |
| 1,899,440 | 2/1933 | Hart | 281/15 B |
| 2,354,589 | 7/1944 | Georgi | 281/15 A |
| 2,822,968 | 2/1958 | Jackson | 224/29 D |
| 3,014,759 | 12/1961 | Bing | 224/29 |

FOREIGN PATENTS OR APPLICATIONS

| 337,166 | 10/1930 | United Kingdom | 281/17 |
|---|---|---|---|
| 23,917 | 1907 | United Kingdom | 248/447 |

Primary Examiner—Jerome Schnall
Attorney, Agent, or Firm—I. Morley Drucker

[57] ABSTRACT

This invention relates to a note pad assembly which is adapted to be placed in a use position on a vehicle seat for ready access by a driver, or passenger, when desired, and which can be easily stored in an out-of-the way non-use position.

The note pad itself is attached to a backing sheet, the backing sheet, in turn, being affixed to the front edge of the vehicle seat. The backing sheet and note pad can then be folded forwardly, and affixed to the front face of the vehicle seat, in a completely out-of-the way, non-use position.

3 Claims, 2 Drawing Figures

AUTOMOBILE NOTE PAD ASSEMBLY

BACKGROUND OF THE INVENTION

Though article carriers and/or writing supports which are attached to a vehicle interior are not uncommon, there has been a need for a compact note pad assembly which is suitable for use in automobiles. Such a note pad would be desirable if it could be readily accessible to a driver, yet could be stowed away in such a manner as to eliminate any hindrance, discomfort, or safety hazard to passengers or driver.

The present invention involves a unique design for a note pad which consists of a means of readily repositioning the pad assembly, from a convenient and accessible use position to a safe and accessible non-use position.

DESCRIPTION OF THE PRIOR ART

The following prior are is the closest found by me:

| PATENT NO. | PATENTEE | ISSUE DATE |
| --- | --- | --- |
| 1,899,440 | Hart | 2-28-33 |
| 2,822,968 | Jackson | 2-11-58 |
| 2,167,731 | Swanstrom | 8-1-39 |
| 2,640,595 | Byford | 6-2-53 |
| 1,347,222 | Hufschmidt | 7-20-20 |
| 2,793,054 | Flom | 5-21-57 |
| 3,011,802 | Ackerman | 12-5-61 |
| 2,810,221 | Reifsnyder | 10-22-57 |

The Hart patent discloses a conventional note pad holder which is designed to be used with a conventional bridge table. The invention consists of a pad holder, which is adapted to be stowed vertically within a separate, out-of-the way metal bracket structure affixed to the frame of the table. The Hart pad assembly, involves a structure completely distinct from that of the applicant's and one that is completely unsuitable for placement in the automobile.

The remaining patents reveal inventions involving note pads which are placed in various positions on other articles within the automobile, such as sun visors, steering wheels and the like.

SUMMARY OF THE INVENTION

The invention relates to a novel construction of a note pad, which enables its stable placement on an automobile seat in a "use" position, adjacent the driver, and which can be readily stably stored in an out-of-the way position when not needed.

The note pad assembly comprises a preferably rectangular somewhat elongated backing sheet, preferably made of leather or vinyl, and an attached pad. The leading (forward) edge of the backing sheet is stitched, or otherwise affixed, to the front edge of the automobile seat. The pad itself is attached to the sheet near the trailing (or rear) portion of the backing sheet.

The backing sheet, when fully extended, lies in a position that is in close proximity to the driver, and enables the driver to write without looking away from the road.

When the note pad is no longer required, the backing sheet is merely folded over the note pad, and the entire assembly is snapped or otherwise affixed to the front face of the seat in a completely out-of-the way position.

DETAILED DESCRIPTION OF THE PREFERRED EMBODIMENT

Figure 1:
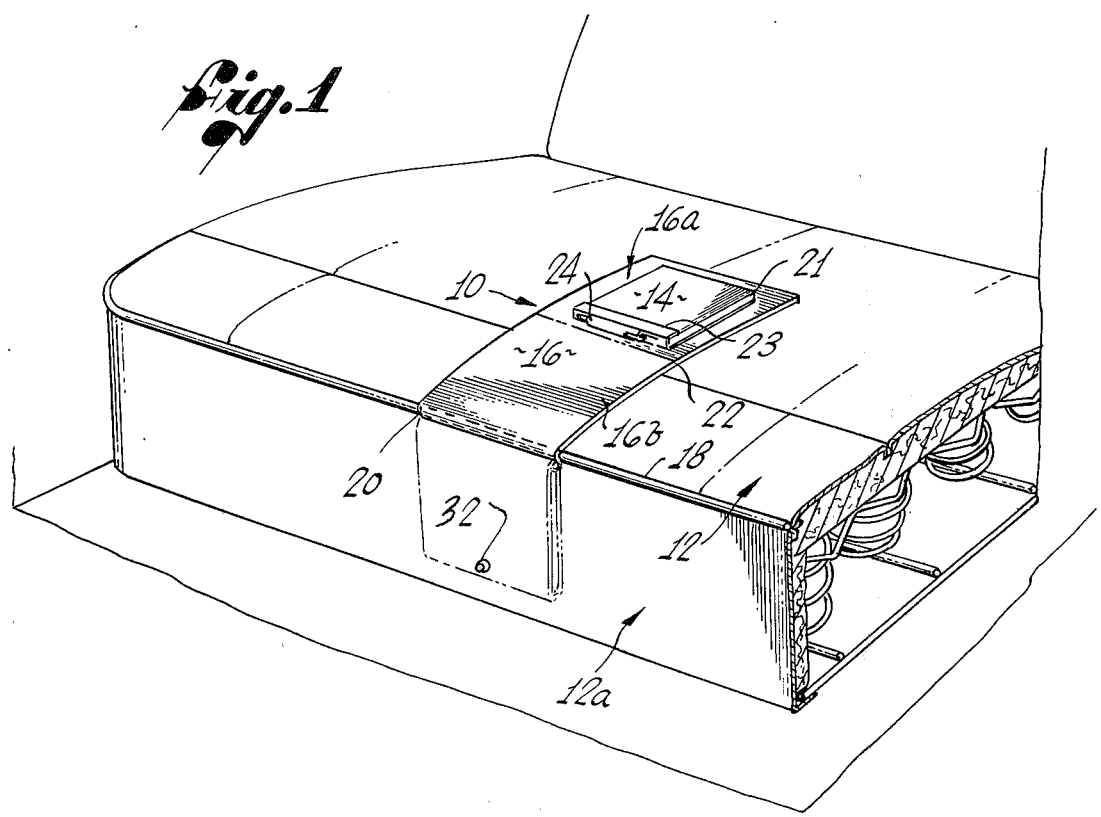
FIG. 1 is a perspective view of the applicant's note pad assemlbly illustrating the backing sheet and note pad attached to a typical automobile seat cushion.

FIG. 1 shows the note pad assembly 10 attached to a typical automobile seat cushion 12. The pad assembly 10 comprises generally a note pad 14 and a preferably rectangular somewhat elongated, backing sheet 16 made, preferably, of either leather or vinyl. The forward edge of sheet 16 is stitched along stitch line 20, or otherwise affixed, to the front seat edge 18. Sheet 16 is of sufficient thinness and flexibility so that it can be readily folded along intermediate fold line 22.

The note pad 14 consists of a conventional pad of paper 21 with a pencil clip 24 also preferably mounted to the note pad frame 23. Pad 14 is affixed to the rearward portion section 16a, of backing sheet 16 in any suitable manner, whereby section 16a acts as a backing pad for note pad 14, when it is being used by the driver. When the backing sheet 16 is fully extended, the forward portion, section 16b, acts as an extension leaf which enables note pad 14 to be properly and stably positioned on a generally flat portion of seat cushion 12.

Figure 2:
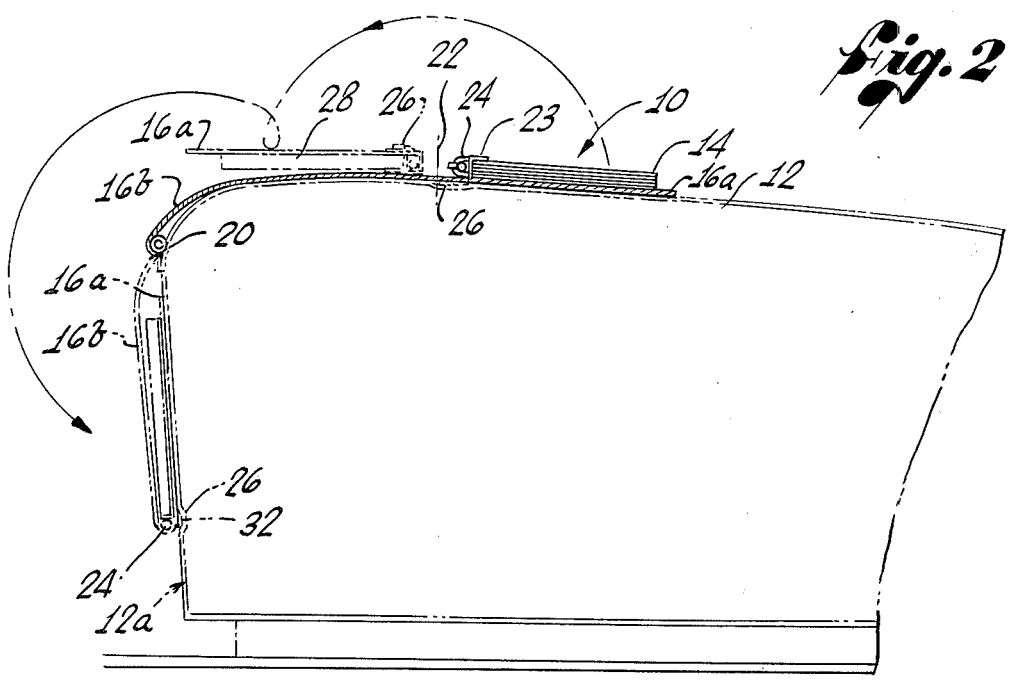
FIG. 2 is a cross-sectional side elevational view showing the note pad in three positions — its use position on the backing sheet, its intermediate position (shown dotted), and its stowed position vertically adjacent to the front seat (shown dotted).

A suitable female snap means 26, as shown in FIG. 2, is provided in the backing sheet 16 near the leading (forward) edge of the lowermost surface of frame 23. The snap means 26 thereby forms a snap opening in section 16a so that it can be easily engaged with a male snap means 32 affixed to the lower front face 12a of the front seat, to achieve a stable, stow-away non-use position. The note pad 14 is designed to be in close proximity to the driver when in the use position as shown in FIG. 1, thus enabling the attentive driver to write, if needed, without turning to look at the pad.

When the note pad 14 is no longer required, the backing section 16a, and attached pad 14, are simply folded first along intermediate fold line 22 and then folded along line 20, (as indicated by the arrows in FIG. 2). Note pad 14 and section 16a now overly leaf section 16b and female snap means 26 can mate with male snap means 32. By the engagement of male snap means 32 in female snap means 26, the entire assembly becomes affixed, in a generally vertical stowed position, to the front face 12a of seat cushion 12.

Thus, the note pad assembly 10 can be readily repositioned from a use to an out-of-the way, non-use position, without the necessity of the driver looking away from the roadway. In this stowed position, the note pad 14 is not only readily accessible but is in a position of safety in that it does not, as a result of its location, create any additional hazard during a vehicle collision.

To summarize, my invention relates to an article of manufacture which comprises, an elongated backing sheet 16 having a first attachment means at the forward end for pivotal attachment to a vehicle seat cushion 12 — preferably in the form of a stitching line 20, a second attachment means for mounting a note pad 14 onto the rear end portion 16a of the backing sheet 16, and a third attachment means mounted on said backing sheet 16 preferably in the form of a snap attachment 26 for attachment of said backing sheet to a vehicle seat cushion 12. The backing sheet is of sufficient thinness and flexibility to be readily folded along an intermediate fold line 22 and furthermore, the backing sheet has a length at least twice the length of the length of the note pad 14, whereby the note pad may be completely enclosed by the backing sheet 16 when the backing sheet is folded thereover. It is to be noted that the note pad 14 is wholly mounted onto the backing sheet 16 specifically at the rearward portion (16a) thereof.

This invention also relates to the combination of the just-described note pad assembly with a vehicle seat cushion 12 and is further characterized by a snap attachment means (26, 32) mounted both to the backing sheet 16 and to the frontal surface of the vehicle seat cushion 12 so that when the backing sheet 16 is folded over — first along the intermediate line 22 — and then further rotated about the pivotal stitching line 20, the snap attachment means 26, 32 confront each other to stably mount the now fully enclosed note pad in an out-of-the way position immediately adjacent the frontal surface 12a of the vehicle seat cushion 12.

I intend to be bound only by the claims which follow.

I claim:

1. The combination of a note pad assembly and a vehicle seat cushion having a seating surface, a frontal surface, and an upper frontal edge where said seating surface and frontal surface merge, which comprises:

an elongated backing sheet of sufficient thinness and flexibility to be readily folded along a line intermediate the ends of said sheet;

a first attachment means at one end of said backing sheet pivotally attaching the back sheet to said upper frontal edge of said vehicle seat cushion;

a note pad having a length less than half the length of said backing sheet a second attachment means for mounting said note pad onto the outer surface of said backing sheet when the backing sheet is disposed on said seating surface and onto the outermost portion of said backing sheet adjacent its other end; and a third attachment means, mounted onto said backing sheet and said frontal surface, for attachment of said backing sheet to the frontal surface of said vehicle seat cushion when said backing sheet and said note pad attached thereto is folded over along said line intermediate the ends thereof and said backing sheet is further rotated about said first attachment means to confront said frontal surface of said vehicle seat cushion to stably mount said note pad immediately adjacent said frontal surface of said vehicle seat cushion.

2. The combination of claim 1 wherein said note pad is wholly mounted onto the said backing sheet.

3. The combination of claim 1 wherein said third attachment means is a snap attachment.

* * * * *